US007221841B2

(12) United States Patent
Chase et al.

(10) Patent No.: US 7,221,841 B2
(45) Date of Patent: May 22, 2007

(54) FLAME RETARDANT UV CURED BUFFERED OPTICAL FIBERS AND BUFFER COMPOSITION

(75) Inventors: David M. Chase, Vernon Hills, IL (US); Kenneth Dake, South Elgin, IL (US); Kelly A. Hawkinson, Aurora, IL (US); Jack Kelly, Woodridge, IL (US); Edward J. Murphy, Arlington Heights, IL (US)

(73) Assignee: DSM IP Assets B.V., TE Heerlen (NL)

( * ) Notice: Subject to any disclaimer, the term of this patent is extended or adjusted under 35 U.S.C. 154(b) by 253 days.

(21) Appl. No.: 10/966,912

(22) Filed: Oct. 15, 2004

(65) Prior Publication Data
US 2005/0089290 A1    Apr. 28, 2005

Related U.S. Application Data

(60) Provisional application No. 60/512,125, filed on Oct. 17, 2003.

(51) Int. Cl.
G02B 6/02    (2006.01)
(52) U.S. Cl. ..................................... 385/128
(58) Field of Classification Search ................ 385/102, 385/109, 128, 101; 524/262, 588, 100; 528/400; 526/320
See application file for complete search history.

(56) References Cited

U.S. PATENT DOCUMENTS

| 4,624,994 | A | 11/1986 | Ansel |
| 4,682,851 | A | 7/1987 | Ansel |
| 4,782,129 | A | 11/1988 | Moschovis et al. |
| 4,794,133 | A | 12/1988 | Moschovis et al. |
| 4,806,574 | A | 2/1989 | Krajewski et al. |
| 4,849,462 | A | 7/1989 | Bishop |
| 5,219,896 | A | 6/1993 | Coady et al. |
| 5,336,563 | A | 8/1994 | Coady et al. |
| 5,456,984 | A * | 10/1995 | Bishop et al. ............... 428/373 |
| 5,479,555 | A | 12/1995 | Rot et al. |
| 6,049,647 | A * | 4/2000 | Register et al. ............. 385/101 |
| 6,114,036 | A * | 9/2000 | Rinehart et al. ............. 428/383 |
| 6,208,790 | B1 | 3/2001 | Zopf et al. |
| 6,215,931 | B1 * | 4/2001 | Risch et al. ................. 385/109 |
| 6,222,969 | B1 * | 4/2001 | Botelho et al. .............. 385/114 |
| 6,265,476 | B1 * | 7/2001 | Krongauz et al. ........... 524/262 |
| 6,630,565 | B1 * | 10/2003 | Van Den Bergen et al. 528/400 |
| 6,714,712 | B2 | 3/2004 | Bishop et al. |
| 6,767,980 | B2 * | 7/2004 | Yurugi et al. ................ 526/320 |
| 6,850,681 | B2 | 2/2005 | Lepont et al. |
| 6,850,682 | B2 * | 2/2005 | Takemura et al. ........... 385/128 |
| 6,957,000 | B2 * | 10/2005 | McAlpine et al. ........... 385/102 |
| 2003/0096904 | A1 * | 5/2003 | Hakuta et al. ............... 524/588 |
| 2003/0118296 | A1 * | 6/2003 | Smith ........................ 385/102 |
| 2003/0133679 | A1 | 7/2003 | Murphy et al. |
| 2004/0002559 | A1 * | 1/2004 | Troutman et al. ........... 524/100 |
| 2004/0247273 | A1 * | 12/2004 | Fabian et al. ............... 385/128 |
| 2005/0031283 | A1 * | 2/2005 | Fabian et al. ............... 385/128 |

FOREIGN PATENT DOCUMENTS

| CN | 1221763 | 7/1999 |
| DE | 34 44 500 A1 | 11/1985 |
| EP | 0 024 593 A2 | 11/1981 |
| EP | 0 041 677 A2 | 2/1983 |
| EP | 0 145 213 A2 | 6/1985 |
| EP | 0 160 379 A1 | 11/1985 |
| EP | 0 166 926 A2 | 1/1986 |
| EP | 0 254 275 A2 | 1/1988 |
| EP | 0 516 438 A1 | 12/1992 |
| EP | 0 528 470 A2 | 2/1993 |
| EP | 0 530 869 A1 | 3/1993 |
| EP | 0 544 343 A1 | 6/1993 |
| EP | 0 707 606 B1 | 10/1998 |
| EP | 1 109 045 A1 | 6/2001 |
| JP | 59226413 A | 12/1984 |
| JP | 214083 | 9/1985 |
| JP | 62-73213 | 4/1987 |
| JP | 7-18204 | 1/1995 |
| JP | 11-72669 | 3/1999 |
| WO | WO 91/11489 A1 | 8/1991 |
| WO | WO 95/02004 A1 | 1/1995 |
| WO | WO 00/37403 A1 | 6/2000 |
| WO | WO 03/40051 A1 | 5/2003 |

OTHER PUBLICATIONS

Zapf, "Buffered Fibres Coated with UV-Materials or Thermo-Plastics? A Comparison," Believed to have been obtained at a trade show.
Zapf, "New Colour Shades for High Fibre Count Applications," Believed to have been obtained at a trade show.
Zapp, "Flamre-retardant UV-curable coatings and ribbon matrix materials," *Wire Industry*, 69 (826), 574 (2002).

* cited by examiner

*Primary Examiner*—Frank G. Font
*Assistant Examiner*—Guy G. Anderson
(74) *Attorney, Agent, or Firm*—Leydig, Voit & Mayer, Ltd.

(57) ABSTRACT

An optical fiber comprising a flame retardant UV light-curable tight-buffer coating coated onto the fiber, wherein said tight-buffer coating is substantially halogen-free, and has a limiting oxygen index of at least about 22%, and wherein said tight-buffer coating is removable from said fiber with a strip-force of less than about 1800 grams when the fiber is upjacketed with said coating at a line speed of at least 300 m/min.

43 Claims, No Drawings

FLAME RETARDANT UV CURED BUFFERED OPTICAL FIBERS AND BUFFER COMPOSITION

This application is a nonprovisional application of provisional Application No. 60/512,125, filed Oct. 17, 2003, and claims the benefit thereof.

BACKGROUND OF THE INVENTION

1. Field of the Invention

The present invention relates generally to flame retardant optical fiber buffer coating compositions, and more particularly, to flame retardant fiber optic buffer coating compositions that can be applied to coated optical fiber and cured at high speed. The invention also relates to optical fiber flame retardant coating compositions which can be cured more efficiently than commercial thermoplastic buffer compositions. The invention also relates to an optical fiber coated with flame retardant buffer coating composition, and to methods of making such optical fiber.

2. Description of Related Art

Optical glass fibers are frequently coated with two or more superposed radiation-curable coatings which together form a primary coating immediately after the glass fiber is produced by drawing in a furnace. The coating which directly contacts the optical glass fiber is called the "inner primary coating" and the overlaying coating is called the "outer primary coating." In older references, the inner primary coating was often called simply the "primary coating" and the outer primary coating was called a "secondary coating," but for reasons of clarity, that terminology has been abandoned by the industry in recent years. Inner primary coatings are softer than outer primary coatings.

Single-layered coatings ("single coatings") can also be used to coat optical fibers. Single coatings generally have properties (e.g., hardness) which are intermediate to the properties of the softer inner primary and harder outer primary coatings.

The relatively soft inner primary coating provides resistance to microbending which results in attenuation of the signal transmission capability of the coated optical fiber and is, therefore, undesirable. The harder outer primary coating provides resistance to handling forces such as those encountered when the coated fiber is ribboned and/or cabled.

Optical fiber coating compositions, whether they are inner primary coatings, outer primary coatings, or single coatings, generally comprise, before cure, a polyethylenically-unsaturated monomer or oligomer dissolved or dispersed in a liquid ethylenically-unsaturated medium and a photoinitiator. The coating composition is typically applied to the optical fiber in liquid form and then exposed to actinic radiation to affect cure.

Optical fiber comprising a waveguide, an inner primary coating and an outer primary (or secondary) coating typically has a diameter of approximately 250 microns. The inner primary coating typically has an applied thickness of 20–40 microns and the outer primary coating typically has an applied thickness of about 20–40 microns.

For the purpose of multi-channel transmission, optical fiber assemblies containing a plurality of coated optical fibers have been used. Examples of optical fiber assemblies include ribbon assemblies and cables. A typical ribbon assembly is made by bonding together a plurality of parallel oriented, individually coated optical fibers with a matrix material. The matrix material has the function of holding the individual optical fibers in alignment and protecting the fibers during handling and installation. Often, the fibers are arranged in "tape-like" ribbon structures, having a generally flat, strand-like structure containing generally from about 2 to 24 fibers. Depending upon the application, a plurality of ribbon assemblies can be combined into a cable which has from several up to about 1000 individually coated optical fibers. An example of a ribbon assembly is described in published European patent application No. 194891. A plurality of ribbon assemblies may be combined together in a cable as disclosed, for example, in U.S. Pat. No. 4,906,067.

The term "ribbon assembly" includes not only the tape-like ribbon assembly described above, but optical fiber bundles as well. Optical fiber bundles can be, for example, a substantially circular array having at least one central fiber surrounded by a plurality of other optical fibers. Alternatively, the bundle may have other cross-sectional shapes such as square, trapezoid, and the like.

Coated optical fibers (or waveguides) whether glass, or, as has come into use more recently, plastic, for use in optical fiber assemblies are usually colored to facilitate identification of the individual coated optical fibers. Typically, optical fibers are coated with an outer colored layer, called an ink coating, or alternatively a colorant is added to the outer primary coating to impart the desired color.

The ink layer, if applied, typically has an applied thickness of about 4–8 microns. The optical fiber, coated with inner primary coating, outer primary coating, and ink layer typically has a diameter of about 260 microns.

Typically, the matrix material of a fiber optic ribbon assembly or cable is separated from the individual coated fibers in order to facilitate splicing two cables, or the connection of a fiber to an input or output. It is highly desirable that the matrix material can be removed from the coated fiber with little or no effect on the outer primary coating or colored ink coating of the fiber. Good removability of the matrix material not only preserves the readily visual identification of the color-coded fiber, it also avoids harming the waveguide during the removal process.

It is well known in the art that optical fiber coated with well-known inner primary, outer primary, and ink or colored coatings have a relatively small diameter that makes such fiber difficult to work with and not entirely satisfactory for handling purposes. It is known to bundle optical fiber in loose buffer tubes. Such tubes include optical fiber surrounded by a gel-type buffer layer which is surrounded by the tube material. In order to improve handleability, and to add to the protection of the optical fiber, it is known to "upjacket" the fiber with a tight buffer coating. Upjacketing of the optical fiber is typically carried out to increase the diameter of the fiber of from about 250 microns to a diameter of from about 600 microns to about 900 microns. In a preferred form, the increased diameter of the fiber falls within the range from about 400 microns to about 900 microns. Upjacketing is desirable for applications such as local area networks, in-home applications, and in commercial establishments. Upjacketed fiber can be bundled without the need for additional gel filling or buffering in loose buffer tubes known in the art.

Because the optical adhesive and durability properties of the tight-buffer coating are not as rigid as those properties are for the inner primary, outer primary, and ink compositions typically used to make optical fiber, extruded thermoplastic materials such as polyvinyl chloride have been used heretofore as the tight-buffer coating. However, thermoplastic materials, such as polyvinyl chloride-based tight-buffer coatings are undesirable, particularly as the demand for tight-buffer coated optical fiber rises.

Equipment for applying extruded thermoplastic buffer coatings is expensive, thermoplastic materials are not suitable for short runs, and it is difficult to apply such coatings. Other drawbacks of thermoplastic coatings are that they must be heated during application, they must be extruded through relatively small dies, e.g., on the order of 250 microns to 900 microns, they must be cooled which can result in undesired stresses in the optical fiber and they are not adapted to be applied at the high line speeds at which optical fiber is made. Various attempts have been made to apply extruded thermoplastics to coated optical fiber at high line speeds, such as at speeds in excess of 100 meters/minute. Application of extruded thermoplastics at such line speeds has been unsatisfactory because the thermoplastic buffer coatings are not readily strippable from the optical fiber.

Stripping the thermoplastic buffer coating has been found to cause damage to the underlying layers of ink, secondary or primary coatings. It is also known that attempts to apply extruded thermoplastics at high line speeds can result in unacceptable microbending induced signal-loss attenuation.

Recently, the art has attempted to provide a U light-curable tight-buffer coating. For example, U.S. Pat. No. 6,208,790 B1 describes such-a coating, but this patent does not describe flame-retardant tight-buffer coatings, and it does not describe UV light-curable coatings which are flame retardant.

It would be advantageous in the art to provide a flame retardant tight-buffer coating composition, suitable for upjacketing optical fiber, that is curable by exposure to actinic, i.e., ultraviolet, radiation as well as such a coating that can be used on existing machinery and in existing processes well known to producers of optical fiber. Such machinery includes but is not limited to the machinery for applying ink to coated fiber and to ribbon-making machinery. Additionally, it would be desirable if the flame retardant tight-buffer coating is easily removed from the fiber without damage to underlying ink, secondary or primary coatings. It would be especially desirable if the flame retardant tight-buffer coating could be applied to coated optical fiber and cured at high speeds without causing unacceptable microbending induced signal-loss attenuation to the optical fiber.

Thus, there remains a need for a UV-curable flame retardant buffer material that can be applied and cured at high speed, without causing unacceptable microbending signal-loss attenuation. There is also a need for a UV-curable flame retardant buffer material that is easily removed from the optical fiber without causing damage to underlying ink, secondary and/or primary coating layers. In its preferred embodiment, the present invention provides a composition that has these and, optionally, other desirable attributes as well.

SUMMARY OF THE INVENTION

The present invention provides an optical fiber which includes a UV-light curable flame retardant tight-buffer coating. The tight-buffer coating includes at least one flame retardant material, and has a limiting oxygen index of at least 22%. Limited oxygen index (LOI) is determined by test method ASTM D2863-97, Test Methods A, which is incorporated herein by reference. Preferably, the coating is halogen-free or substantially halogen-free. As used herein, the term substantially halogen-free means that the amount of halogen in the coating composition is less than about 5 wt. %, more preferably less than about 2 wt. %, and most preferably less than about 1 wt. %. The % of halogen in this invention is defined as the wt % of halogen atom, relative to the total weight of the coating composition. Thus, it is contemplated that halogen can be included in the composition as an impurity, or even intentionally, as for example, through the use of halogen-containing flame retardants, coating additives such as anti-static agents, fluorinated surface active additives and the like, and pigments, as are well known, so long as the composition is substantially halogen-free as that term is used herein.

The present invention further provides a radiation-curable optical fiber tight-buffer coating composition. The composition includes, in the uncured state, at least one monomer or oligomer having a radiation-curable functional group and at least one flame-retardant material, preferably a halogen-free flame-retardant material. The buffer coating accordingly has one or all of various physical properties before and/or after cure. The buffer coating in some embodiments has a limiting oxygen index (LOI) of at least 24% and preferably is substantially halogen-free. The buffer coating, in some embodiments, can be applied at high line speed without causing unacceptable microbending signal-loss attenuation. By line speed is meant the speed at which the tight buffer coating is applied to a fiber (including a fiber to which one or more previous coatings have been applied) and cured. In other embodiments, the buffer coating when cured upon said optical fiber is subsequently easily removed without damage to the underlying ink, secondary or primary coating layers. In addition the coating when cured upon said optical fiber does not cause unacceptable increase in microbending induced signal-loss attenuation. Optical fiber coated with the buffer coatings of the invention pass flammability testing according to Underwriter's Laboratories UL1581.

In a more specific embodiment, the invention provides a radiation-curable optical fiber tight-buffer coating composition, which, in the uncured state, includes at least one monomer or oligomer having a radiation-curable functional group and at least one flame-retardant material, preferably a halogen-free flame-retardant material wherein the composition, when cured, exhibits self-extinguishing behavior when exposed to a flame under conditions, for example, as specified in Underwriters laboratories procedure UL 1581, which is incorporated by reference herein. The flame retardant is desirably selected from the group consisting of metal hydroxides, metal carbonates, metal oxide pigments, phosphate esters, phosphonate esters, phosphine oxide compounds, phosphorus-containing ethylenically-unsaturated oligomeric compounds and mixtures thereof. The coating of this embodiment, when cured, has a limiting oxygen index (LOI) of at least 22%; the coating of the invention can also have a limited oxygen index (LOI) of at least 24%, at least 26%, or even 28% or greater.

The present invention also provides a method for making a flame-retardant optical fiber comprising upjacketing an optical fiber with a tight-buffer coating composition, wherein said tight-buffer coating composition, when cured has a limiting oxygen index (LOI) of at least 22%, at least 24%, at least 26%, or at least 28%, and is easily removable without damage to underlying ink or coating layers of said optical fiber. Additionally, the processing of the optical fibers, and the cure of the buffer coating composition, can be conducted at high speeds for increased productivity when compared to the present state of the art for the processing of extruded thermoplastic compositions.

The coating compositions of some embodiments of the present invention exhibit self-extinguishing behavior when exposed to a flame. Similarly, optical fibers coated with the coating composition exhibit exceptional flame retardancy. This self-extinguishing behavior or flame-retardant characteristic makes the tight-buffer coated optical fiber of these embodiments of the present invention particularly useful for indoor home and/or commercial use due to the increased safety afforded by the reduced flammability of the fiber. The coating composition of the present invention is useful as an upjacketing coating. It has been found, unexpectedly, that UV-light-curable tight buffer coating compositions that include particulate flame retardants, such as elemental oxides, hydroxides and carbonates are capable of high speed cure at line speeds of about 300 meters per minute (m/min) or more and they exhibit desirable microbend signal-loss attenuation and desirable strippability.

DETAILED DESCRIPTION OF THE INVENTION

The present invention provides, in one embodiment, a flame-retardant optical fiber coated with a UV light-curable tight-buffer coating composition. The tight-buffer coating composition comprises at least one flame retardant, and when cured has a limiting oxygen index of at least 22%. The cured composition can also have a limiting oxygen index (LOI) of at least 24%, at least 26% or even 28% or greater. Preferably, the cured buffer coating is easily removed from the coated optical fiber without damage to the underlying ink, secondary or primary coatings. In addition, the flame retardant coating when cured upon said optical fiber does not cause unacceptable increase in microbending induced signal-loss attenuation. It will be understood that the physical properties of the cured tight-buffer composition of the various embodiments of the present invention can be determined on the cured composition as applied to an optical fiber, or it can be determined by casting the tight-buffer composition in the form of a film having a thickness of approximately 250 microns. In a preferred embodiment of the invention, the tight-buffer coating composition and the tight-buffer coating on the optical fiber is free of halogen. In other embodiments, the tight-buffer coating composition and the tight-buffer coating on the optical fiber is substantially halogen-free. In other embodiments, the tight-buffer coating composition can be applied to coated optical fiber and cured at a line speed of at least 300 m/min on optical fiber upjacketing equipment known in the art. The tight-buffer coating composition can also be cured at even higher line speeds, such as at least 400 m/min, at least 600 m/min, and even 900 m/min, 1000 m/min, or greater.

The optical fiber of the present invention includes a conventional, optical fiber known in the art. Such optical fiber typically includes a glass or plastic core (or waveguide), a cladding on the waveguide, a primary coating on the cladding and a secondary coating on the primary coating. The secondary coating can be colored, as is known, to provide a way to identify different individual fiber. Alternatively, the optical fiber as described can include an "ink" layer (as is known) on the secondary coating. The ink layer can be colored, again as a way to identify individual fibers, or marked with other indicia for identification.

In accordance with the one embodiment of the present invention, conventional optical fiber is coated with the tight-buffer coating composition. The tight-buffer coating can be applied to a secondary coating, to an ink layer or to matrix material with equal facility. The coating includes at least one flame retardant, which imparts flame retardant characteristics to the tight-buffer coated optical fiber. Preferably, the cured tight-buffer coat is strippable from the next adjacent layer, for example the outer primary, ink layer, or even the matrix layer so that the optical fiber can be accessed for splicing, connection to an input or an output device, or the like. The cured buffer coat preferably can be stripped from the coated optical fiber without causing damage to the underlying coatings, e.g., the matrix, ink, secondary or primary coatings.

In accordance with another embodiment of the invention, a UV light-curable tight-buffer coating composition is provided. The tight-buffer coating composition contains one or more radiation-curable oligomers or monomers having at least one functional group capable of polymerization when exposed to actinic radiation. Suitable radiation-curable oligomers or monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinyl ether, vinyl ester, N-substituted acrylamide, N-vinyl amide, maleate esters, and fumarate esters. Preferably, the ethylenic unsaturation is provided by a group that contains acrylate, methacrylate, N-vinyl or styrene functionality.

Another type of functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

A mixture of mono-, di-, tri-, tetra-, and higher functionalized oligomers can be used to achieve the desired balance of properties, wherein the functionalization refers to the number of radiation-curable functional groups present in the oligomer.

The oligomers usually comprise a carbon-containing backbone structure to which the radiation-curable functional group(s) are bound. For example, the oligomer can be represented by the formula:

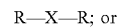

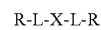

where R is a radiation-curable functional group,

X is a carbon-containing polymeric backbone, an aromatic group containing moiety, or a combination thereof, and L is a linking group.

The size of the carbon-containing backbone is preferably selected to provide the desired molecular weight and the selection of the backbone can take into account the linking group L, if a linking group is included in the oligomer. The number average molecular weight of the oligomer is desirably of from about 200 to about 30,000, preferably of from about 500 to about 7,000, and most preferably from about 1,000 to about 5,000 Daltons.

Illustrative of suitable carbon-containing polymeric backbones include a polymeric backbone of a polyether, a polyolefin, a polyester, a polyamide, a polycarbonate, an alkyd or mixtures thereof. Further, by way of example, the carbon-containing backbone of the oligomer can comprise aromatic groups and ring-opened epoxy groups or alkoxy groups.

The aromatic groups can be derived, for example, from bisphenol units, such as bisphenol A. Suitable oligomers are well known to those skilled in the art. A preferred oligomer is a diglycidyl ether derivative of bisphenol A, to which acrylate functional groups have been bound. A commercially available example of such an oligomer is CN120 (Sartomer), an epoxydiacrylate which has a molecular weight of about 500 Daltons, and when cured has a Tg of about 65° C.

Examples of suitable linking groups include alkoxy or ring opened epoxy such as ethoxy, propoxy, butoxy, and repeat units thereof. L can also be a urethane or urea linking group.

In the present invention, urethane (meth)acrylate oligomers including phosphorous-containing urethane (meth)acrylate oligomers are preferred. Examples of phosphorous-containing urethane (meth)acrylate oligomer can be found in U.S. Pat. No. 5,456,984, which is incorporated herein by reference and made a part hereof.

The wt % of urethane (meth)acrylate oligomer used in the tight buffer coating composition is from about 10 wt % to about 70 wt %, relative to the total weight of the composition. The wt % of urethane (meth)acrylate oligomer used in the tight buffer coating composition can also be from about 12 wt % to about 60% wt %, relative to the total weight of the composition.

The wt % of phosphorous-containing urethane (meth)acrylate oligomer used in the tight buffer coating composition is from about 10 wt % to about 70% wt %, relative to the total weight of the composition. The wt % of phosphorous-containing urethane (meth)acrylate oligomer used in the tight buffer coating composition can also be from about 12 wt % to about 60 wt %, relative to the total weight of the composition. The phosphorous-containing urethane (meth)acrylate oligomer is a flame retardant material itself.

The UV light-curable tight-buffer compositions of the present invention preferably contain one or more reactive diluents which are used to adjust the viscosity of the composition and properties of the cured coating. The reactive diluent can be a low viscosity monomer having at least one functional group capable of polymerization when exposed to actinic radiation. Usually, the viscosity of the low viscosity diluent monomer is from about 50 to about 500 centipoise (cps) at 25° C. Examples of suitable viscosities for the tight-buffer coating compositions range from about 500 to about 50,000 centipoise at 25° C. Preferred amounts of radiation-curable diluent monomer include from about 5 wt % to about 50 wt %, preferably from about 5 wt % to about 30 wt %, more preferably, from about 8 wt % to about 18 wt % based on the total weight of the composition.

The functional group in the reactive diluent may be of the same nature as that used in the radiation-curable monomer or oligomer. Preferably, the functional group present in the reactive diluent is capable of copolymerizing with the radiation-curable functional group present on the radiation-curable monomer or oligomer. More preferably, the radiation-curable functional group forms free radicals during curing which can react with the free radicals generated on the surface of the surface treated optical fiber.

The reactive diluent can be a monomer or mixture of monomers having an ethylenic unsaturated functionality, including acrylate functionality, vinyl functionality, thiol-ene, amine-ene functionality. The reactive diluent can be an aromatic or an aliphatic acrylate. Preferred reactive diluents are isodecylacrylate, 2-phenoxyethylacrylate, tripropyleneglycol diacrylate, and N,N-dimethylacrylamide.

In keeping with one embodiment of the invention, the tight-buffer coating and the tight-buffer coating composition further comprise a halogen-free flame retardant material. By halogen-free it is meant that the flame retardant does not contain halogen. Halogen-free flame retardants that have been found to be useful are metal oxides, metal hydroxides and metal carbonates, phosphate esters, phosphonate esters, phosphine oxide compounds, flame retardant phosphorus-containing ethylenically unsaturated oligomers, and phosphorus-containing flame retardant acrylate and methacrylate oligomers ((meth)acrylate oligomers). The composition can include one or more flame retardant materials.

Flame retardancy can be imparted to UV curable buffers of the present invention by incorporating elements such as antimony, boron, tin, molybdenum, phosphorus, aluminum, magnesium, and zinc. By way of illustration and not in limitation of the invention, these elements can be included in the uncured buffer coating as oxides, hydroxides, and carbonates, and as hydrates of the oxides, hydroxides, and carbonates. These elemental oxides, hydroxides, and carbonates, and their various hydrated forms are preferably incorporated as small particle size pigment dispersions. These elements, especially phosphors, can be added to the buffer composition as soluble and miscible organic derivatives. In a preferred embodiment of the invention, combinations of flame retardant pigments and miscible organic phosphorus compounds added are to the buffer composition.

Illustrative suitable flame-retardant metal oxides include antimony oxide, antimony trioxide, antimony pentoxide, sodium antimonate, and hydrates of the antimony oxides and the like. These metal oxides are typically added as dispersed pigments. Other metal oxides such as aluminum trihydroxide, also known as alumina trihydrate, magnesium hydroxide, molybdenum oxides, calcium carbonate, stannic oxide, zinc stannate, zinc hydroxy stannate, zinc borate, and barium metaborate are suitable. In a preferred embodiment of the present invention, aluminum trihydroxide (produced by Alcoa Industrial Chemicals known as SpaceRite Alumina) is the flame retardant. The present invention thus provides, in some embodiments, UV light curable tight-buffer coating compositions that include particulate or pigment-type elemental oxides, hydroxides and carbonates that can be cured at high line speeds, such as, at least 300 m/min on optical fiber upjacketing equipment known in the art. The tight-buffer coating composition can also be cured at even higher line speeds, such as at least 400 m/min, at least 600 m/min, and even 900 m/min, 1000 m/min, or greater.

The tight-buffer coatings of these embodiments of the invention exhibit desirable microbend signal-loss attenuation, such as, of no more than about 0.8 dB/km at a signal wavelength of 850 nm, and preferably of no more than about 0.6 dB/km at a signal wavelength of 1300 nm. In this regard, attenuation is the loss of signal (in dB) as compared to the signal carried by an uncoated fiber. The tight-buffer coatings of these embodiments of the invention are also easily stripped from the underlying coatings of optical fiber. The strip force of such coatings can be, for example, less than about 1800 grams, when the buffer coating is applied at line speed greater than the line speed at which thermoplastic tight-buffer coatings are applied. Thus a strip force of less than about 1800 grams can be achieved when the buffer coating is applied at a line speed of at least 300 m/min on optical fiber upjacketing equipment known in the art. The strip force of less than about 1800 grams can be achieved even higher line speeds, such as at least 400 m/min, at least 600 m/min, and even 900 m/min, 1000 m/min, or greater.

Illustrative suitable flame-retardant plasticizers include aryl phosphate esters, such as triaryl phosphate ester and trixylyl phosphate ester, cyclic diphosphonate esters, and the like. Alkylated triphenyl phosphate esters, such as isopropylated triphenyl phosphate ester, are particularly preferred. Other phosphates and phosphonates suitable for use in the invention include alkyl phosphate esters, aryl phosphate esters, alkylaryl phosphate esters, alkylated polyaryl phosphate esters, such as alkylated polyphenyl phosphate esters, alkylphosphonate esters, aryl phosphonate esters, alkylaryl phosphonate esters, and alkylated polyaryl phosphonate esters, such as, alkylated polyphenyl phosphonate esters. Flame-retardant nitrogen-containing heterocyclic ethylenically unsaturated oligomers suitable for use in the invention include pentafunctional melamine acrylate, the acrylic acid or methacrylic acid esters of tris(hydroxyethyl) isocyanurate, triallyl isocyanurate, triallyl cyanurate, and triacryloylhexahydro triazine.

The following are, by way of illustration of and not in limitation of, flame retardants suitable for use in the coating compositions of the present invention: as alkyl phosphate esters, tributyl phosphate, tributoxyethylphosphate; as aryl phosphate esters, triphenyl phosphate, trixylyl phosphate; as alkylaryl phosphate esters, 2-ethylhexyl diphenyl phosphate, isodecyl diphenyl phosphate, diethyl phenethylamidophosphate; as alkylated (poly)arylphosphate esters, isopropylated triphenyl phosphate, t-butyl triphenyl phosphate, tricresyl phosphate; as alkyl and alkylaryl phosphonate esters, dimethyl methylphosphonate, diethyl bis(hydroxyethyl)aminomethyl phosphonate, dimethyl phenylphosphonite, diethyl phenylphosphonite, diethyl (2-oxopropyl)phosphonate; as cyclic esters and polyphosphorus compounds, cyclic diphosphonate methylester, pentaerythritol cyclic phosphate, bisphenol-A bis(diphenyl phosphate), and resorcinol bis(diphenylphosphate).

As further illustration of suitable composition components, it is known in the art to produce flame retardant compositions comprising certain phosphorus-containing ethylenically unsaturated oligomers. Particularly preferred are phosphorous-containing urethane (meth)acrylate oligomers. Examples of such suitable components, which may be used in part to produce the halogen-free flame retardant buffer compositions of the present invention, are disclosed in U.S. Pat. No. 5,456,984, which is incorporated herein by reference.

It will be understood by those skilled in the art that such phosphorous-containing urethane (meth)acrylate oligomers may, without adding any additional flame-retardant material, function both as a radiation-curable oligomer and as the flame retardant material of the tight buffer coating composition of the present invention. Alternatively, a different type of flame retardant material can be added to such phosphorus-containing urethane (meth)acrylate oligomer systems.

The amount of flame-retardant material included in the tight-buffer coating composition is not narrowly critical, but there must be a sufficient amount to impart the desired flame retardancy to the tight-buffer coated optical fiber. Preferably, the flame retardant will be included in the composition in an amount sufficient to impart self-extinguishing characteristics to the cured coating. Generally, the amount of flame-retardant material included in the composition should be from about 0% wt to about 70 wt %, relative to the total weight of the composition, preferably from about 10 wt % to about 70 wt %, relative to the total weigth of the composition, more preferably from about 15% to about 60% by weight of the composition. It will be appreciated by those skilled in the art that the amount of flame-retardant in any of the tight-buffer coating compositions can vary depending on the type of flame-retardant used. Thus, the precise amount of flame-retardant to be used can be readily ascertained. It is also preferred that the tight-buffer coatings, when cured upon the optical fibers, are optically transparent. However, it is also preferred that the tight-buffer coatings when cured upon the optical fibers, are semi-transparent or visually opaque and colored to allow fibers to be identified readily, and to facilitate visual inspection of the application of the tight-buffer coatings.

The tight-buffer composition of the present invention further comprise one or more photoinitiators. The photoinitiator are desirably free-radical photoinitiators. Examples of photoinitiators include Irgacure 651 (benzildimethyl ketal or 2,2-dimethoxy-1,2-diphenylethanone, Ciba-Geigy), Irgacure 184 (1-hydroxy-cyclohexyl-phenyl ketone as the active component, Ciba-Geigy), Darocur 1173 (2-hydroxy-2-methyl-1-phenylpropan-1-one as the active component, Ciba-Geigy), Irgacure 907 (2-methyl-1-[4-(methylthio)phenyl]-2-morpholino propan-1-one, Ciba-Geigy), Irgacure 369 (2-benzyl-2-dimethylamino-1-(4-morpholinophenyl)-butan-1-one as the active component, Ciba-Geigy), Esacure KIP 150 (poly{2-hydroxy-2-methyl-1-[4-(1-methylvinyl)phenyl]propan-1-one}, Fratelli Lamberti), Esacure KIP 100 F (blend of poly {2-hydroxy-2-methyl-1-[4-(1-methylvinyl)phenyl]propan-1-one} and 2-hydroxy-2-methyl-1-phenyl-propan-1-one, Fratelli Lamberti), Esacure KTO 46 (blend of poly {2hydroxy-2-methyl-1[4-(1-methylvinyl)phenyl]propan-1-one}, 2,4,6-trimethylbenzoyldiphenylphosphine oxide and methylbenzophenone derivatives, Fratelli Lamberti), acylphosphine oxides such as Lucirin TPO (2,4,6-trimethylbenzoyl diphenyl phosphine oxide, BASF), Irgacure 819 (bis (2,4,6-trimethylbenzoyl)-phenyl-phosphineoxide, Ciba-Geigy), Irgacure 1700 (25:75% blend of bis (2,6-dimethoxybenzoyl)2,4,4-trimethylpentyl phosphine oxide and 2-hydroxy-2-methyl-1-phenyl-propan-1-one, Ciba-Geigy), and the like.

In addition to the above-described components, silicone additives are also used in the tight-buffer coating composition. Examples of silicone additives include dimethylsiloxane polyether and commercially available products, such as DC-57, DC-190, DC-1248 (Dow Corning), SH-28PA, SH-29PA, SH-30PA, SH-190 (Tora.gamma.-Dow Corning), KF351, KF352, KF353, KF354 (Shin-Etsu Chemical Industries), and L-700, L-7002, L-7500, FK-024-90 (Nippon Uniker), Ebecryl 350, Tegorad 2200 N. The wt % of silicone additive is about 0.5 wt % to about 10 wt %, relative to the total weight of the composition.

One embodiment of the present invention is a radiation-curable optical fiber tight-buffer composition comprising:
  (A) about 10 wt % to about 70 wt % of a urethane (meth)acrylate oligomer, relative to the total weight of said composition, said urethane (meth)acrylate oligomer being free of phosphorous-containing urethane (meth)acrylate oligomer;
  (B) about 5 wt % to about 30 wt % of one or more reactive diluents; relative to the total weight of said composition;
  (C) about 10 wt % to about 70 wt % of one or more halogen-free flame retardant materials, relative to the total weight of said composition; and
  (D) about 0.1 wt % to about 15 wt % of an photoinitiator, relative to the total weight of said composition.

Another embodiment of the present invention is a radiation-curable optical fiber tight-buffer composition comprising:
  (A) about 10 wt % to about 70 wt % of a phosphorous-containing urethane (meth)acrylate oligomers, relative to the total weight of said composition;

(B) about 5 wt % to about 30 wt % of one or more reactive diluents; relative to the total weight of said composition;

(C) about 0 wt % to about 70 wt % of one or more halogen-free flame retardant materials, relative to the total weight of said composition, wherein said one or more flame retardant materials exclude urethane acrylate phosphorous-based oligomer; and (D) about 0.1 wt % to about 15 wt % of an photoinitiator, relative to the total weight of said composition.

Tight-buffer coatings (and compositions when cured) have a limiting oxygen index (LOI) of at least 22%; the coatings (and compositions when cured) of the invention can also have a limited oxygen index (LOI) of at least 24%, at least 26%, or even 28% or greater. Tight-buffer coatings, when cured, with a greater LOI are desirable. The LOI of the coating is determined by ASTM D2863-97, which is incorporated by reference herein. The LOI can be accomplished with a tight-buffer coating that is halogen-free, or with a tight-buffer coating that is substantially halogen-free.

Tight-buffer coatings of the present invention are particularly suited for application and cure upon optical fibers at high speed using existing machinery adapted to the application of UV-curable liquid coatings. Upjacketing of optical fiber is typically carried out to increase the diameter of the fiber of from about 250 microns to a diameter of from about 600 microns to about 900 microns. In a preferred form, the increased diameter of the fiber falls within the range from about 400 microns to about 900 microns. One advantage of compositions of some embodiments of the present invention is that the compositions can be applied and cured at a line speed of at least 300 m/min on optical fiber upjacketing equipment known in the art. The tight-buffer coating composition can also be applied and cured at even higher line speeds, such as at least 400 m/min, at least 600 m/min, and even 900 m/min, 1000 m/min, or greater.

A desirable criterion for the determination of a suitable application speed for upjacketing optical fiber is the microbend induced signal-loss attenuation of the upjacketed fibers. In this regard, attenuation is the loss of signal (in dB) as compared to the signal carried by an uncoated fiber. It is desirable that this attenuation be limited to no more than 0.8 dB/km at a signal wavelength of 850 nanometer (nm), and no more that 0.6 dB/km at a signal wavelength of 1300 nm. More preferably the attenuation should be no more than 0.6 dB/km at 850 nm, and no more than 0.4 dB/km at 1300 nm. It is known from present practice that extruded thermoplastic tight-buffer coatings cannot be applied at speeds in excess of 100 m/min without incurring microbend signal-loss attenuation above the foregoing desired limits. It is particularly advantageous that tight-buffer coatings of the present invention can be applied and cured upon optical fiber using adapted existing machinery at speeds much higher than the speed at which present extruded thermoplastic tight-buffer coatings can be applied.

The microbend induced signal-loss attenuation either in a loose fiber or in fiber in optical cable, is measured by the Optical Time Domain Reflectometer (OTDR) method, a method known in the art, which is incorporated by reference herein. OTDR is an instrumental technique for characterizing a fiber that uses radar. An optical pulse is applied to a fiber and the resulting power reflected back to the input is displayed on a screen as a function of time or distance. Typical OTDR information includes total fiber signal-loss attenuation loss per unit length, connector insertion loss, connector return loss, splice loss, and other signal losses. The microbend induced signal-loss attenuation of optical fiber made with the compositions of some of the embodiments of the present invention described herein is loss per unit length measured as dB/km. Measurements are made at 850 nm and 1300 nm, and were made on EXFO Model FTB-300 OTDR.

In yet another aspect, the present invention provides tight-buffer coatings that are adapted for high-speed application with low resultant signal-loss attenuation that can be removed from the coated optical fiber without damage to underlying ink and secondary and primary coating layers on the optical fiber. Removal of the upjacket coating facilitates splicing two or more cables, the connection of fiber to an input or output device, and the like. The ability to remove the cured tight-buffer coating not only preserves the visual identification of the color-coded fiber, it also avoids harming the waveguide during the stripping process.

The removability characteristic of the cured tight-buffer coating is determined by measuring the peak force required to strip the cured tight-buffer coating from optical fiber using a stripping tool, such as the stripping tool available from Micro Electronics Inc., and known as Micro-Strip Precision Stripper Fiber-Optics. For measurement of the peak strip force to remove tight-buffer coating from a typical optical fiber whose diameter has been raised from about 250 microns to about 900 microns, the tool used is designated MSI-23S-40-FS. When used in the manner specified by the manufacturer of the stripping tool it is found that extruded thermoplastics require a strip force of greater than about 1600 grams to even 2000 grams or more. Very often it is seen that damage is done to the underlying ink or secondary or primary coating layers of the optical fiber at such a high strip force. Damage to the underlying coatings is typically seen on upjacketed optical fiber upjacketed with extruded thermoplastic tight-buffer coating applied at speeds in excess of about 100 m/min. The tight-buffer coatings of the present invention demonstrate a peak strip force of less than about 1800 grams, more preferably less than about 1600 grams, and more preferably less than about 1400 grams, when applied and cured upon the optical fiber at a processing speed of higher than 100 m/min, even when applied and cured upon the optical fiber at speed of 600 m/min and higher. The peak strip force herein after is called "strip force." It can readily be appreciated by those skilled in the art that the removal characteristics of the cured tight-buffer composition in accordance with some embodiments of the present invention is of particular advantage over the present art of extruded thermoplastics. Substantially higher line speeds or processing speeds can be achieved with the tight-buffer coatings described herein.

In order to measure the peak force that is required to remove the tight-buffer coating with the Micro-Strip Precision Stripper, a test method was developed on an Instron Tensile Tester Model 4201 or equivalent. This method allows quantitative and repeatable measurements to be made, thus allowing the differentiation between coating systems. The stripper tool is mounted in the bottom grips of the Instron Tensile Tester, after the fiber has been inserted into the stripper and the bottom of the tool has been secured tight with a small clamp. A constant amount of fiber, 1 inch, is stripped through the blades, and this length is measured as the sample is placed into the stripping tool. The top of the fiber is secured in the pneumatic top grip of the Instron. The initial distance between both grips is one inch. An appropriate load cell is used to determine the maximum force that is required to remove the tight-buffer coating. The crosshead speed of the Instron is set at a constant pull rate of 20 in/min.

One embodiment of the invention is an optical fiber comprising a flame retardant UV light-curable tight-buffer coating coated onto the fiber, wherein said tight-buffer coating is substantially halogen-free, and has a limiting oxygen index of at least about 22%, and wherein said tight-buffer coating is removable from said fiber with a strip-force of less than about 1800 grams when the fiber is upjacketed with said coating at a line speed of at least 300 m/min.

Another embodiment of the invention is an optical fiber comprising a flame retardant UV light-curable tight-buffer coating coated onto the fiber, wherein said tight-buffer coating is substantially halogen-free, and has a limiting oxygen index of at least about 24%, and wherein said tight-buffer coating is removable from said fiber with a strip-force of less than about 1800 grams when the fiber is upjacketed with said coating at a line speed of at least 300 m/min.

The degree of cure of the tight buffer coating composition of the present invention is indicated by the percentage of reacted acrylated saturation (% RAU). The tight buffer coating composition of the present invention when applied on the optical fiber and cured, demonstrates a % RAU of at least about 80% when the fiber is upjacketed to a diameter of about 900 microns at a line speed of at least about 300 m/min.

In another embodiment, the tight buffer coating composition of the present invention when applied on the optical fiber and cured, demonstrates a % RAU of at least about 90% when the fiber is upjacketed to a diameter of about 900 microns at a cure speed of at least about 400 m/min.

The method of determining % RAU (FTIR Test) is described in U.S. Pat. No. 6,714,712, which is herein incorporated by reference.

In yet another aspect, the present invention provides a method for upjacketing an optical fiber with a flame retardant tight-buffer coating composition. The method includes forming an optical fiber by, for example, conventional methods, applying the tight-buffer coating composition to the outermost layer of the optical fiber and curing the tight-buffer coating by subjecting the tight-buffer-coated fiber to ultraviolet light.

One embodiment of the present invention is a method for making a flame-retardant optical fiber comprising:

a) providing a tight-buffer coating composition, said tight-buffer coating composition being substantially halogen-free, and when cured, having a limiting oxygen index of at least about 22%, and being removable from said fiber with a strip-force of less than about 1800 grams when the fiber is upjacketed with said coating at a line speed of at least 300 m/min;

b) applying said tight-buffer composition to an optical fiber; and curing said tight-buffer composition.

Production of the upjacketed flame retardant optical fiber using the tight-buffer coating of the present invention offers several advantages. It not only provides a flame-retardant optical fiber, it also allows the coating composition to be cured in-line by exposure to ultraviolet light. Curing of the tight-buffer coating of the present invention can take place at high speed, such as, for example, the line speed at which the optical fiber itself is made, it avoids the use of expensive and cumbersome thermoplastic processing equipment, and it permits upjacketing without subjecting the optical fiber to stresses that could affect the light transmission of the fiber.

EXAMPLES

The following examples are illustrative of, but are not in limitation of, the present invention.

These examples illustrate the preparation of flame-retardant optical fiber tight-buffer coating composition in accordance with some embodiments of the invention.

The acrylate esters, urethane acrylate; flame retardants, and other additives were mixed in the indicated percentages by weight to form the coating compositions, as shown in Table I. The tight-buffer coating was then formed as a thin film of approximately 10 mils, or applied at a thickness of approximately 13 mils to optical fibers, and tested for various properties as also indicated in Table I. The viscosity of each composition in its liquid state was also measured.

TABLE I

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Urethane Diacrylate Oligomer (a) | 17.00 | 17.00 | 17.00 | — | — | 26.71 | — | 16.00 |
| Urethane Diacrylate Phosphorous Based Oligomer (k) | — | — | — | — | 26.75 | — | — | — |
| CN 992 Urethane Diacrylate Oligomer (b) | — | — | — | 13.00 | — | — | 26.35 | — |
| SR306 tripropylene glycol diacrylate (b) | 20.93 | 20.93 | 20.93 | — | 27.66 | 28.20 | 28.20 | 17.00 |
| N,N-dimethylacrylamide (d) | — | — | — | 9.74 | — | — | — | — |
| DYSPERBYK111 dispersant additive (f) | 1.10 | 1.10 | 1.10 | 1.25 | 0.74 | 0.74 | 0.74 | 1.00 |
| Polyfil 402 hyrdated alumina (m) | — | — | — | 60.00 | 34.29 | 33.85 | 32.81 | 51.00 |
| SpaceRite S-3 hydrated alumina (c) | 51.75 | 51.80 | 51.85 | — | — | — | — | — |
| Irganox 1035 antioxidant additive (g) | 0.37 | 0.37 | 0.37 | 0.4 | 0.46 | 0.40 | 0.40 | 0.30 |
| Bentone SD-2 anti-settling agent (j) | — | — | — | — | 1.35 | 1.35 | 1.35 | 1.10 |
| Irgacure 819 photoinitiator (h) | 0.10 | 0.10 | 0.10 | 0.10 | 0.10 | 0.10 | — | 0.10 |
| Irgacure 184 photoinitiator (h) | 0.50 | 0.50 | 0.50 | 0.50 | 0.50 | 0.50 | — | 0.50 |
| Irgacure 1884 photoinitiator (i) | — | — | — | — | — | — | 2.00 | — |
| DDR48400 Blue colorant additive (i) | 0.25 | — | — | — | — | — | — | — |
| DDR56740A Yellow colorant additive (i) | — | 0.10 | 0.15 | — | 0.15 | 0.15 | 0.15 | — |
| DDR65270A Red colorant additive (i) | — | 0.10 | — | — | — | — | — | — |
| DC1248 silicone additive (e) | — | — | — | — | 4.00 | 8.00 | 4.00 | 8.00 |
| DC 190 silicone additive (e) | 1.00 | 1.00 | 1.00 | 1.01 | — | — | — | — |
| Phosflex 31L phosphate additive (d) | 7.00 | 7.00 | 7.00 | 10.00 | — | — | — | 5.00 |
| TegoRad2200N reactive silicone additive (o) | — | — | — | — | 4.00 | — | 4.00 | — |
| CN120 phenoxy ethyl acrylate (b) | — | — | — | 4.00 | — | — | — | — |
| Total Weight % | 100.00 | 100.00 | 100.00 | 100.00 | 100.00 | 100.00 | 100.00 | 100.00 |

TABLE I-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Viscosity (cps @ 25° C.) | 3200 | 3150 | 3185 | 1800 | 1530 | 4700 | 4300 | 5000 |
| LOI as per ASTM 2863–97 (%) | 30 | 29 | n/a | 48.0 | 26 | 22.5 | 25 | 30.5 |
| Underwriters Laboratories Test UL1581 | Pass | Pass | Pass | Pass | Pass | Pass | Pass | Pass |
| Strip Force (g) (at ≧1300 m/min & 900 microns) | <1800 | <1800 | <1800 | <1000 | <500 | <500 | <500 | <500 |
| % RAU | >80 | >80 | >80 | >80 | >80 | >80 | >80 | >80 |

(a) A proprietary urethane diacrylate oligomer CAS No. 37302-70-8 of polypropylene glycol Mw 1025, toluene diisocyanate, and hydroxy ethyl acrylate.
(b) Available from Sartomer Company Inc., Exton, PA.
(c) Available from Alcoa Industrial Chemicals Inc., Bauxite, AR. Aluminum trihydroxide CAS No. 21645-51-2.
(d) Available from Akzo Nobel Chemicals Inc., Dobbs Ferry, NY. A polyaryl phosphate flame retardant additive CAS No. 68937-41-7.
(e) DC 190 silicone additive available from Dow Corning Corp., Midland, MI.
(f) Dispersant additive CAS No. 7664-38-2 available from BYK-Chemie USA, Wallingford, CN.
(g) Antioxidant additive available from Ciba Specialty Chemicals Corp., Tarrytown, NY.
(h) Photoinitiators available from Ciba Specialty Chemicals Corp., Tarrytown, NY.
(i) Proprietary colorants for UV curable compositions from Chroma Injecta Color Systems Inc., Chicago Heights, IL.
(j) Anti-settling agents available from Elementis Specialties, Hightstown, NJ.
(k) A proprietary urethane diacrylate oligomer prepared in accordance with U.S. Pat. No. 5,456,984 using the phosphorus containing diol Fyroltex HP from Akzo Nobel Chemicals Inc., Dobbs Ferry, NY.
(l) A proprietary urethane diacrylate oligomer of toluene diisocyanate and hydroxy ethyl acrylate with CAS numbers of 54687-25-1 or 68479-07-2.
(m) Available from Custom Grinders, Chatsworth, CA.
(n) Silicone additive from Witco Corp., OrganoSilicones Group, Greenwich, CT.
(o) Silicone additive from Degussa/Goldschmidt Chem. Corp., Hopewell, VA.
(p) Phosphate ester available from Great Lakes Chem. Corp., Indianapolis, IN.

Attenuation properties for both Multi-Mode (MMF) and Single-Mode (SMF) fibers upjacketed to about 900 microns using the tight-buffer coating composition of Ex. 1 are set forth in Table II. Processing speeds are as indicated, as are the laser-test wavelengths for the attenuation measurements. Also set forth are % RAU values and tight-buffer removal force, indicated as strip force in grams. Single-Mode fibers (SMF) are broadly known to those in the art as being glass optical fibers wherein the information transmittal is conveyed by means of a single laser wavelength. Multi-Mode fibers (MMF) are those wherein the information is conveyed by simultaneous transmittance of multiple laser wavelengths.

TABLE II

| Buffered MMF @ 900µ | 850 nm | 1310 nm | % RAU | Strip Force |
|---|---|---|---|---|
| Original Uncoated Fiber | 2.59 dB | 0.49 dB | n/a | n/a |
| Thermoplastic control @ 70 m/m | 2.70 dB | 0.60 dB | n/a | 1600–1850 |
| UV Ex. 1 @ 300 m/m | 2.53 dB | 0.48 dB | 89 | 1031 |
| UV Ex. 1 @ 600 m/m | 2.53 dB | 0.57 dB | 81 | 560 |
| UV Ex. 1 @ 900 m/m | 2.67 dB | 0.58 dB | 80 | 120 |
| Buffered SMF @ 900µ (a) | | 1310 nm | | 1550 nm |
| Original Uncoated Fiber | | 0.34 dB | | 0.20 dB |
| UV Ex. 1 @ 750 m/m | | 0.34 dB | | 0.19 dB |

(a) For SMF the maximum allowable attenuation increase, as compared to the original attenuation of the uncoated fiber is 0.02 dB/km.

The Examples demonstrate the flame retardancy, and the other novel features of the tight-buffer coating of the present invention. It is especially noted that attenuation increases are lower, and less strip force is required of the UV cure tight-buffer coating even though the process speed is much faster than the thermoplastic control composition.

The invention claimed is:

1. An optical fiber comprising a flame retardant UV light-curable tight-buffer coating coated onto the fiber, wherein said tight-buffer coating is substantially halogen-free, and has a limiting oxygen index of at least 22%, and wherein said tight-buffer coating is removable from said fiber with a strip-force of less than 1800 grams when the fiber is upjacketed with said coating at a line speed of at least 300 m/min.

2. The optical fiber according claim 1, wherein said tight-buffer coated fiber passes the flammability test according to Underwriters Laboratories specification UL1581.

3. An optical fiber comprising a flame retardant UV light-curable tight-buffer coating coated on the optical fiber, wherein said tight-buffer coating is substantially halogen-free, and has a limiting oxygen index of at least 24%, and wherein said tight-buffer coating is removable from said fiber with a strip-force of less than 1800 grams when the fiber is upjacketed with said coating at a line speed of at least 300 m/mm.

4. The optical fiber according to claim 3, wherein said tight-buffer coated fiber passes the flammability test according to Underwriters Laboratories specification UL1581.

5. The optical fiber according to claim 3, wherein said tight-buffer coating is substantially halogen-free, and has a limiting oxygen index of at least 26%.

6. The optical fiber according to claim 3, wherein said tight-buffer coating is substantially halogen-free, and has a limiting oxygen index of at least 28%.

7. The optical fiber according to claim 3, wherein said tight-buffer coating is removable from said fiber with a strip-force of less than 1600 grams when the fiber is upjacketed with said coating at a line speed of at least 300 m/mm.

8. The optical fiber according to claim 3, wherein the fiber is upjacketed to a diameter of 900 microns at a line speed of at least 300 m/mm, and the UV light-curable tight-buffer coating has a % RAU of at least 80%.

9. The optical fiber according claim 8, comprising a flame retardant UV light-curable tight-buffer coating, wherein the fiber is upjacketed to a diameter of 900 microns at a line speed of at least 400 meters/minute, and the UV light-curable tight-buffer coating has a % RAU of at least 80%.

10. The optical fiber according to claim 8, wherein said tight-buffer coating is removable from said fiber with a strip-force of less than 1400 grams.

11. The optical fiber according to claim 1, wherein said tight-buffer coating, in the uncured state, comprises:
at least one radiation-curable monomer or oligomer; and
at least one flame-retardant material selected from the group consisting of metal hydroxides, metal carbonates, metallic oxides, phosphate esters, phosphonate esters, phosphine oxides flame-retardant nitrogen-containing heterocyclic ethylenically unsaturated compound; phosphorus-containing acrylate and methacrylate functional oligomers and mixtures thereof.

12. The optical fiber according to claim 11, wherein said oligomer is a urethane acrylate oligomer.

13. The optical fiber according to claim 3, wherein said tight buffer coating, in the uncured state, comprises:
at least one radiation-curable monomer or oligomer; and
at least one flame-retardant material selected from the group consisting of metal hydroxides, metal carbonates, metallic oxides, phosphate esters, phosphonate esters, phosphine oxides flame-retardant nitrogen-containing heterocyclic ethylenically unsaturated compound; phosphorus-containing acrylate and methacrylate functional oligomeric and mixtures thereof.

14. The optical fiber according to claim 13, wherein said fiber is upjacketed to a diameter of 900 microns at a processing speed of at least 400 m/mm and the UV light-curable tight-buffer has a % RAU of at least 80%.

15. The optical fiber according to claim 13, wherein said flame retardant material is selected from the group consisting of aluminum trihydroxide, magnesium hydroxide, and mixtures thereof.

16. The optical fiber according to claim 13, wherein said a flame retardant material is selected from the group consisting of calcium carbonate, aluminum carbonate, and mixtures thereof.

17. The optical fiber according to claim 13, wherein said flame retardant material is selected from the group consisting of antimony oxide, titanium oxide, and mixtures thereof.

18. The optical fiber according to claim 13, wherein said flame retardant material is selected from the group consisting of phosphate esters, or phosphonate esters, triphenyl phosphate, diethyl ethylphosphonate, tris(2-cyanoethyl) phosphine oxide, and mixtures thereof.

19. The optical fiber according to claim 13, wherein said flame retardant material is selected from the group consisting of pentafunctional melamine acrylate, acrylic acid or methacrylic acid esters of tris(hydroxyethyl) isocyanurate, triallyl isocyanurate, triallyl cyanurate, triacryloylhexahydro triazine, and mixtures thereof.

20. The optical fiber according to claim 13, wherein said flame retardant material is selected from the group consisting of ethylenically unsaturated phosphorus-containing urethane oligomers.

21. A radiation-curable optical fiber tight-buffer coating composition, comprising, in the uncured state, at least one monomer or oligomer having a radiation-curable functional group and a halogen-free flame-retardant material, wherein said coating composition, when coated onto an optical fiber and cured, has a limiting oxygen index of at least 22%, and is removable from said optical fiber with a strip-force of less than 1800 grams when the fiber is upjacketed with said coating at a line speed of at least 300 m/mm.

22. The composition according to claim 21, wherein said composition further comprised a silicone additive.

23. The composition according to claim 21, wherein said composition when cured upon said optical fiber passes the reduced flammability test according to Underwriters Laboratories specification UL1581.

24. A radiation-curable optical fiber tight-buffer coating composition, comprising, in the uncured state, at least one monomer or oligomer having a radiation-curable functional group and a halogen-free flame-retardant material, wherein said coating composition, when coated onto an optical fiber and cured, has a limiting oxygen index of at least 24%, and is removable from said optical fiber with a strip-force of less than 1800 grams when the fiber was upjacketed with said coating at a line speed of at least 300 m/mm.

25. The composition according to claim 24, wherein said composition further comprises a silicone additive.

26. The tight-buffer coating composition according to claim 24, wherein said tight-buffer coating composition comprises at least one flame retardant material selected from the group consisting of metal hydroxides, metal carbonates, metallic oxides selected from the group consisting of phosphate esters, phosphonate esters, phosphine oxides, nitrogen-containing heterocyclic ethylenically unsaturated compounds; phosphorus-containing acrylate and methacrylate functional oligomeric compounds and mixtures thereof.

27. The tight-buffer coating composition according to claim 24, wherein said composition comprises a flame retardant material selected from the group consisting of aluminum trihydroxide, magnesium hydroxide, and mixtures thereof.

28. The tight-buffer coating composition according to claim 24, wherein said composition comprises calcium carbonate, aluminum carbonate, and mixtures thereof.

29. The tight-buffer coating composition according to claim 24, wherein said composition comprises antimony oxide, titanium oxide, and mixtures thereof.

30. The tight-buffer coating composition according to claim 24, wherein said tight-buffer coating comprises a flame retardant material selected from the group consisting of phosphate esters, phosphonate esters, triphenyl phosphate, diethyl ethylphosphonate, tris(2-cyanoethyl)phosphine oxide, and mixtures thereof.

31. The tight-buffer coating composition according to claim 24, wherein said composition comprises pentafunctional melamine acrylate, acrylic acid or methacrylic acid esters of tris(hydroxyethyl) isocyanurate, triallyl isocyanurate, triallyl cyanurate, triacryloylhexahydro triazine, and mixtures thereof.

32. The tight-buffer coating composition according to claim 24, wherein said composition comprises ethylenically unsaturated phosphorus-containing urethane oligomers.

33. The tight-buffer coating composition according to claim 24, wherein said composition when cured upon said optical fiber has a signal-loss attenuation of no more than 0.8 dB/km at 850nm, and no more than 0.4 dB/km at 300 nm.

34. The tight-buffer coating composition according to claim 24, wherein said composition when cured upon said optical fiber passes the reduced flammability test according to Underwriters Laboratories specification UL1581.

35. A radiation-curable optical fiber tight-buffer coating composition, comprising, in the uncured state, at least one monomer or oligomer having a radiation-curable functional group, aluminum trihydroxide and a polyarylphosphate, wherein said composition, when applied to an optical fiber and cured at a line speed of at least 300 meters/min, results in a coated optical fiber with a microbend signal-loss attenuation of no more than 0.8 dB/km at 850 nm and no more than 4 0.4 db/km at 1300 nm, and a strip force of less than 1800 grams.

36. A method for making a flame-retardant optical fiber comprising:

a) providing a tight-buffer coating composition, said tight-buffer coating composition being substantially halogen-free, and when cured, having a limiting oxygen index of at least 21%, and being removable from said fiber with a strip-force of less than 1800 grams when the fiber is upjacketed with said coating at a line speed of at least 300 m/mm;

b) applying said tight-buffer composition to an optical fiber; and curing said tight-buffer composition.

37. A method for making a flame-retardant optical fiber comprising upjacketing an optical fiber with a tight-buffer coating composition, wherein said tight-buffer coating composition is substantially halogen-free, and when cured, has a limiting oxygen index of at least 24%, and is removable from said fiber with a strip-force of less than 1800 grams when the fiber is upjacketed with said coating at a line speed of at least 300 m/mm.

38. A radiation-curable optical fiber tight-buffer composition comprising:
   (A) about 10 wt % to about 70 wt % of a urethane (metha)crylate oligomer, relative to the total weight of said composition, said urethane acrylate oligomer being free of phosphorus-containing urethane (meth) acrylate oligomer;
   (B) about 5 wt % to about 30 wt % of one or more reactive diluents; relative to the total weight of said composition;
   (C) about 10 wt % to about 70 wt % of one or more halogen-free flame retardant materials, relative to the total weight of said composition; and
   (D) about 0.1 wt % to about 15 wt % of an photoinitiator, relative to the total weight of said composition,
   wherein said coating composition, when coated on an optical fiber and cured, has a limiting oxygen index of at least 22%, and is removable from said optical fiber with a strip-force of less than 1800 grams when the fiber is upjacketed with said coating at a line speed of at least 300 m/min.

39. The composition according to claim 38, further comprising:
   (E) about 0.5 wt % to about 10 wt % of a silicone additive, relative to the total weight of said composition.

40. The composition according to claim 38, wherein one or more flame retardant materials include aluminum trihydroxide.

41. A radiation-curable optical fiber tight-buffer composition comprising:
   (A) about 10 wt % to about 70 wt % of a phosphorous-containing urethane (meth)acrylate oligomer, relative to the total weight of said composition;
   (B) about 5 wt % to about 30 wt % of one or more reactive diluents; relative to the total weight of said composition; and
   (C) about 0 wt % to about 70 wt % of one or more halogen-free flame retardant materials, relative to the total weight of said composition, wherein said one or more flame retardant materials exclude urethane acrylate phosphorous-based oligomer; and
   (D) about 0.1 wt % to about 15 wt % of an photoinitiator, relative to the total weight of said composition,
   wherein said composition, wherein said coating composition, when coated on an optical fiber and cured, has a limiting oxygen index of at least 22%, and is removable from said optical fiber with a strip-force of less than 1800 grams when the fiber is upjacketed with said coating at a line speed of at least 300 m/min.

42. The radiation-curable composition of claim 41, further comprising:
   (E) about 0.5 wt % to about 10 wt % of a silicone additive, relative to the total weight of said composition.

43. The composition according to claim 41, wherein one or more flame retardant materials include aluminum trihydroxide.

* * * * *